July 5, 1938.  J. ROBINSON  2,122,622
INDICATING APPARATUS
Filed Nov. 13, 1936   2 Sheets-Sheet 1

INVENTOR
James Robinson,
By Watson, Coit, Morse & Grindle
ATTYS.

July 5, 1938.  J. ROBINSON  2,122,622
INDICATING APPARATUS
Filed Nov. 13, 1936  2 Sheets-Sheet 2
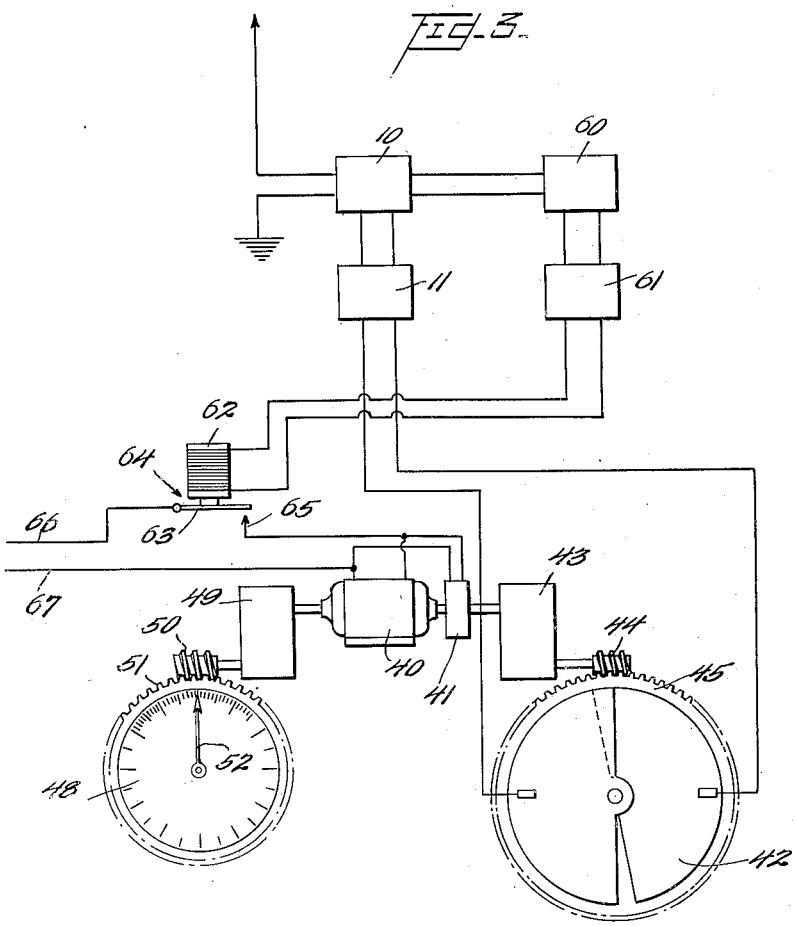

Patented July 5, 1938

2,122,622

UNITED STATES PATENT OFFICE 2,122,622

INDICATING APPARATUS

James Robinson, London, England

Application November 13, 1936, Serial No. 110,771
In Great Britain November 14, 1935

9 Claims. (Cl. 73—4)

This invention relates to indicating apparatus and is concerned with such apparatus comprising relatively moving indicating and scale parts, to which it is secured to apply a correction from a remote control point.

The invention comprises the combination of an indicating instrument comprising relatively movable indicating and scale parts and wireless receiving means automatically controlling the zero relationship of said parts according to a characteristic of the received wireless transmission. A wireless transmission having a characteristic predetermined according to the correction required is thus employed to produce the required correction of the instrument.

One important application of the invention is to height indicating instruments employed on aircraft. It is usual in aircraft to employ an altimeter consisting of a barometric device to provide an indication of the height of the aircraft with respect to some arbitrary level. It is the usual routine to set the altimeter to zero before the aircraft leaves the aerodrome so that the instrument only provides an indication as to the heigh of the aircraft with respect to the level of the aerodrome under the same atmospheric conditions as those obtaining when the instrument was set to zero. Should atmospheric conditions change, and this is very probable during a long flight, the altimeter becomes inaccurate in its indication, and thus largely useless for the purpose for which it is intended. It is the object of the present invention to obviate this disadvantage and for this purpose use is made of wireless transmissions from one or more of a plurality of transmitters at different localities, (e. g., aerodromes) and transmitting signals having a characteristic, such as a frequency characteristic, varied according to ambient atmospheric pressure at the transmitter.

According to a feature of this invention there is provided in or for an aircraft, height indicating apparatus comprising the combination of an altimeter of the barometric type, a receiver for wireless signals varying in character according to the local atmospheric pressure conditions at the transmitter and means controlled by the output of the receiver to apply a correction to the altimeter. Thus, as the aircraft passes in the vicinity of a transmitting station the altimeter in the aircraft is automatically corrected for local atmospheric conditions and with respect to the altitude of that station, if it is different from other stations. Alternatively, or in addition, the transmissions employed may be arranged always to provide corrections with respect to sea level.

It is preferable to employ transmissions in which a frequency (e. g., the carrier frequency) is varied through a range having a predetermined relationship with a range of atmospheric pressures and to provide wireless receiving means in the aircraft which is differently responsive to the signals varying in frequency to control the indication provided at the altimeter.

In one form the receiver comprises two resonant devices tuned respectively to two frequencies spaced apart by an amount at least equal to the range of frequencies of the incoming signals and means is provided controlled by the outputs of the resonant devices operating in the opposed sense to produce a relative movement of the indicator and scale of the altimeter. It is also convenient to provide means controlled by the outputs of the resonant devices aforesaid automatically to adjust their effective tuning in the direction to equalize their outputs.

In one specific construction the receiver is of the heterodyne type having a constant frequency stage comprising the aforesaid resonant devices and in this case the effective tuning of these devices is conveniently varied by variation of the tuning of the local oscillator circuit.

In a further form of the invention, the proper setting of the altimeter scale is effected by means of a motor which may be employed to slowly rotate the scale whenever correction is desired. This motor is controlled by a receiver for signals of the character hereinbefore described. It is further so coupled to the receiver as to vary the tuning of the latter; for example, by the slow rotation of a tuning condenser. De-energization of the motor circuit is effected when the receiver is brought into tune with the incoming signal, and the scale is accordingly stopped at a position determined by the frequency of the signal, and is thus corrected to the barometric pressure at the transmitter.

In the accompanying drawings showing diagrammatically embodiments of the invention by way of examples:

Figure 3 is a diagrammatic representation of a further modified arrangement.

Figure 1:
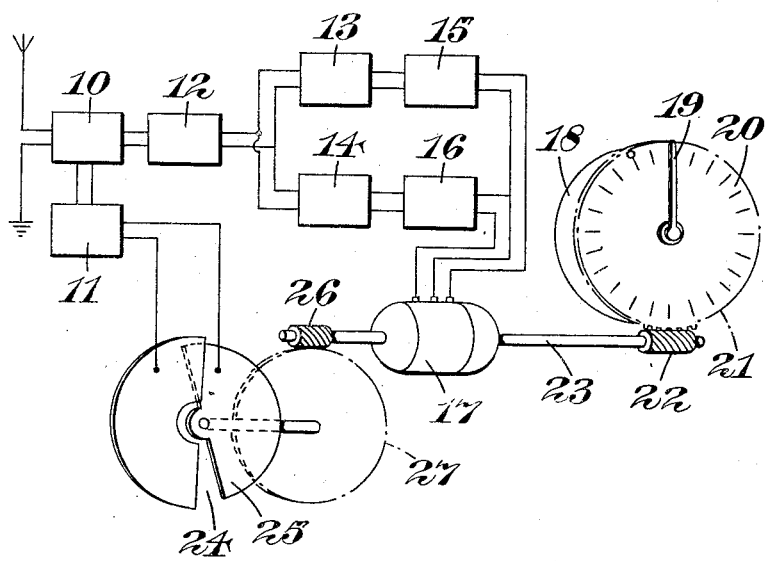
Figure 1 is a diagram showing an altimeter with an associated wireless receiver for adjusting the altimeter automatically by movement of the normally fixed scale of the instrument.

Referring to the drawings, there is shown a receiver of the heterodyne type for signals of which the carrier-frequency is varied through a range and in a predetermined manner according to the local atmospheric conditions at the transmitter. The receiver comprises a frequency-changer 10 having associated therewith a local oscillator 11 for converting the received signals to a constant frequency which may be a supersonic frequency or a frequency within the audible range, the required signals being selected by signal-accepting means 12 which is sufficiently broadly tuned to accept signals within a range equal to that of the range of frequency variation employed at the transmitter.

The output of the signal-acceptor 12 is applied to two similar resonant devices 13 and 14 tuned respectively to frequencies corresponding approximately to the limits of the range of frequencies passed by the signal-acceptor 12 so that these resonant devices have oppositely sloping characteristics for this range of frequencies and provide equal outputs at the mean frequency. The outputs of the resonant devices 13 and 14 are applied respectively to rectifiers 15 and 16 and the outputs of these rectifiers are employed in the opposed sense to operate a small reversible electric motor 17.

An altimeter of the barometric type indicated at 18 comprises an indicating pointer 19 which is operated in the known manner by the pressure-responsive means of the altimeter and a dial 20 which is also rotatable. The dial is provided with gear-teeth 21 at its periphery meshing with a worm 22 driven by the shaft 23 of the motor 17.

The circuit of the oscillator 11 comprises a variable condenser 24 of which a movable electrode 25 is coupled to a gear wheel 27 in mesh with a worm 26 on the shaft 23 so that the condenser is adjusted by the rotation of the motor 17. In this manner the tuning of the receiver is automatically adjusted under the control of the outputs from the rectifiers 15 and 16 to a condition in which the signals applied to the resonant devices are approximately equal as regards frequency to the mean frequency of the devices 13 and 14. A corresponding adjustment of the dial 20 of the altimeter is produced by means of the worm 22 so that the zero position of the instrument may be said to correspond with the mean frequency of the resonant devices 13 and 14.

In operation, the transmission frequencies may be allocated to the atmospheric pressure conditions at the transmitter or alternatively, to a function of this local atmospheric pressure corresponding to sea level. As the aircraft passes in the vicinity of a transmitter which need therefore only be of low power, the zeroizing signal is received in the aircraft, and presuming that atmosperic conditions have changed, the received signal converted as regards frequency by the frequency-changer 10, will not be equal to the mean frequency of the resonant devices 13 and 14 and will therefore provide a response in one of these devices which is greater than the response in the other device, depending upon whether the received frequency is higher or lower than the mean frequency of the devices 13 and 14. There will therefore be obtained from the outputs of the rectifiers 15 and 16 a resultant current which also depends as to its sign on the relationship of the received frequency and the mean frequency of the resonant devices 13 and 14. The motor 17 is therefore rotated in a direction depending upon the sign of the current, and thereby adjusts the condenser 24 in order to alter the frequency of the local oscillator 11 in the direction to make the frequency of the output of the frequency-changer substantially equal to the mean frequency of the resonant devices 13 and 14. When this condition is reached the outputs of these devices are equal since their effects are opposed and no further rotation of the motor 17 occurs. At the same time, the operation of the motor serves to adjust the dial 20 by an amount corresponding to the extent of adjustment of the condenser 24 and thus to a position corresponding in a predetermined manner with the frequency of the incoming signals.

The altimeter 20 is thus corrected and remains in the corrected position until the aircraft passes sufficiently near to another cooperating transmitting station and then the altimeter may be further corrected automatically depending upon the frequency of the signals transmitted.

Figure 2:
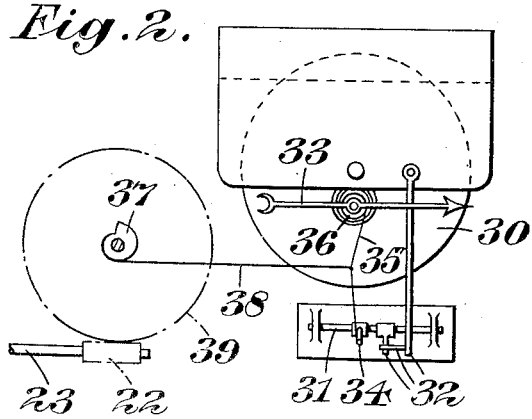
Figure 2 shows a modification of the arrangement shown in Figure 1, in which the correction is applied to the normally moving indicator of the instrument.

Instead of applying the correction for the dial 20 of the instument, as represented in Figure 1, it may in some cases be of advantage to apply this correction to the normally moving indicator of the instrument. For instance, in Figure 2 there is shown a well-known form of barometric device in which the pressure response of a closed container 30 is transferred to a rock shaft 31 through a linkage 32 and the resulting movement of the rock shaft 31 is transferred to a pointer 33 by means of an arm 34 on the rock shaft and a flexible member 35 connected to this arm and passing around a drum 36 on the spindle of the pointer 33. For producing the correction according to the present invention there is provided on the shaft 23 (see also Figure 1) a cam 37 and a flexible member 38 which is joined to the flexible member 35 and passes around the cam 37. Thus, in this arrangement the rotation of the cam 37 by the motor 17 under the control of the received signals produces a variation of the lateral displacement of the flexible member 35 by means of the flexible member 38 to an extent and in a direction depending upon the received signals in order to provide a correction for the indicating pointer 33 of the altimeter which nevertheless remains under the control of the pressure-responsive device 30 of the instrument.

It will be understood that instead of using wireless transmissions controlled as to carrier-frequency according to atmospheric conditions at the transmitters, these transmitters may be similarly controlled as regards the modulation frequency, and that in this case the frequency-changer 10 of the receiver will in known manner be preceded by means to isolate the modulation frequency for application to the frequency-changer 10. It is not essential to employ a receiver of the heterodyne type and a straight type receiving circuit may be used, although in this case it will of course be necessary to adjust the resonant frequency of both resonant devices 13 and 14 under the control of their outputs in order to bring the mean frequency into agreement with the received signals. Furthermore, instead of providing a variable condenser for adjusting the tuning of the local oscillator 11, other means for this purpose may be employed, for instance, means for applying a varying potential to a valve or valves of the receiving means.

In Figure 3 of the drawings a modified arrangement for correcting the altimeter zero reading is disclosed. In this arrangement signals which are transmitted from a ground station at a frequency determined by the barometric pressure are passed into a frequency-changer 10 having a local oscillator 11. The output of the frequency-changer 10 is applied to a signal-acceptor 60 for the frequency-converted signals. The signal-acceptor 60 is preferably one of high selectivity, for example, one employing a mechanical resonant device such as a piezo-electric crystal. The output of the signal-acceptor 60 is applied to a rectifier 61, and the rectified signals are in turn employed to energize the winding 62 of a relay indicated generally at 64 and including a movable switch element 63 and a stationary switch element 65. The relay switch is arranged in series with one of the leads 66 of a source of current supply, the remaining lead being indicated at 67. A motor 40 and an electro-magnetically operated brake 41 are energized from this source of supply and are arranged in parallel in the circuit. The brake is preferably so constructed that when energized the shaft of the motor 40 is released, the brake being applied and the motor stopped when the relay switch is opened.

At one end of the motor shaft is arranged a reduction gearing 43 which drives the movable element 42 of a condenser through a worm 44 and worm gear 45. This condenser is arranged to control the frequency of the local oscillator 11 and the tuning of the oscillator is varied cyclicly through a range of frequencies as the motor 40 is rotated. The motor 40 also drives the movable scale 48 of an altimeter through reduction gearing 49 and worm gearing 50, 51, the pointer of the altimeter being indicated at 52.

The ratio of the gearing associated with the motor 40 is so chosen that when the motor is started, for example by the manual closing of the relay switch 63, the movable element 42 of the oscillator condenser is slowly and continuously rotated through approximately 180°, and the scale 48 of the altimeter is rotated through a much smaller angle. The progressive tuning of the local oscillator 11 proceeds until the transmitted signal is converted to the frequency of the signal-acceptor 60, when the rectified impulse operates the relay 64, thus opening the circuit of the motor 40 and applying the brake 41 to the motor shaft. The scale 48 is thus stopped at a point which is determined by the frequency of the transmitted signal and the proper zero setting is effected.

A manually controlled reversing circuit may be associated with the motor 40 so that the condenser 42 and the scale 48 may be reset to an initial position, corresponding to one limit of the range of frequencies which are likely to be transmitted, preceding each correction of the zero setting of the altimeter. This is desirable since otherwise the apparatus, having once been set by the sequence of operations hereinbefore described, would not properly respond to a signal requiring a less displacement of the scale.

Although the invention has particular reference to the correction of height indicating apparatus for aircraft, it is also applicable to other instruments, such as clocks, which may or may not be employed on aircraft and which require to be corrected from one or more remote control points. It will also be appreciated that any of the arrangements hereinbefore described may be applied to rotate a movable pointer over a fixed scale which is calibrated to represent altitudes, the receiver picking up a signal transmitted from another aircraft at a frequency which is determined by the altitude of that aircraft. In this manner a visual representation of the altitude of another aircraft in the vicinity of the receiving aircraft may be produced, with the results set forth more at length in my prior copending application Serial No. 11,491.

Having thus described the invention, what is claimed as new and desired to be secured by Letters Patent is:

1. In or for an aircraft, height indicating apparatus comprising the combination of an altimeter of the barometric type having relatively movable indicator and scale parts, a broadly tunable receiver for wireless signals, which receiver is differently responsive for incoming signals varying in frequency through a range of frequencies having a predetermined relationship with a range of atmospheric pressures, said receiver comprising two resonant devices tuned respectively to frequencies spaced apart by an amount at least equal to said range of frequencies, and means controlled by the outputs of said resonant devices operating in the opposed sense to produce a relative movement of the indicator and scale parts of the altimeter.

2. In or for an aircraft, height indicating apparatus comprising the combination of an altimeter of the barometric type having relatively movable indicator and scale parts, a broadly tunable receiver for wireless signals, which receiver is differently responsive for incoming signals varying in frequency through a range of frequencies having a predetermined relationship with a range of atmospheric pressures, said receiver comprising two resonant devices tuned respectively to frequencies spaced apart by an amount at least equal to said range of frequencies, means controlled by the outputs of resonant devices operating in the opposed sense to produce a relative movement of the indicator and scale parts of the altimeter, and means controlled by the outputs of the said resonant devices automatically to adjust the effective tuning of the receiver in the direction to equalize their outputs.

3. In or for an aircraft, height indicating apparatus comprising the combination of an altimeter of the barometric type having relatively movable indicator and scale parts, a broadly tunable receiver for wireless signals varying in frequency through a range of frequencies having a predetermined relationship with a range of atmospheric pressures, which receiver is of the heterodyne type and comprises a frequency-changer and a constant frequency stage, said constant frequency stage comprising two resonant devices tuned respectively to frequencies spaced apart by an amount at least equal to said range of frequencies, means controlled by the outputs of said resonant devices operating in the opposed sense to produce a relative movement of said indicator and scale parts of the altimeter, and means controlled by the outputs of said devices automatically to control the said frequency-changer to adjust the tuning of the receiver in the direction to equalize the outputs of said resonant devices.

4. In apparatus for correcting the zero reading of an altimeter, the combination with cooperating elements affording a visual indication, said elements being relatively movable in response to variation in barometric pressure, of means for automatically effecting an auxiliary relative movement of said elements to a position determined by the frequency of a transmitted signal, said means comprising a signal receiver including two resonant devices tuned to different frequencies, and mechanism controlled by the outputs of said resonant devices for effecting relative movement of said elements in different directions in response to predominance of the output from one resonant device or the other.

5. In apparatus for correcting the zero reading of an altimeter, the combination with cooperating elements affording a visual indication, said elements being relatively movable in response to variation in barometric pressure, of means for automatically effecting an auxiliary relative movement of said elements to a position determined by the frequency of a transmitted signal, said means comprising a signal receiver including two resonant devices tuned to different frequencies, mechanism controlled by the outputs of said resonant devices for effecting relative movement of said elements in different directions in response to predominance of the output from one resonant device or the other, and means controlled by the outputs of said resonant devices for automatically adjusting the tuning of the receiver in the direction to equalize such outputs.

6. In apparatus for correcting the zero reading of an altimeter, the combination with cooperating elements affording a visual indication, said elements being relatively movable in response to variation in barometric pressure, of means for automatically effecting an auxiliary relative movement of said elements to a position determined by the frequency of a transmitted signal, said means comprising a signal receiver including two resonant devices tuned to different frequencies, mechanism controlled by the outputs of said resonant devices for effecting relative movement of said elements in different directions in response to predominance of the output from one resonant device or the other, and means operable by said mechanism and to an extent proportionate to the relative movement of said elements for automatically adjusting the tuning of the receiver in the direction to equalize such outputs.

7. In apparatus for correcting the zero reading of an altimeter, the combination with cooperating elements affording a visual indication, said elements being relatively movable in response to variation in barometric pressure, of means for automatically effecting an auxiliary relative movement of said elements to a position determined by the frequency of a transmitted signal, said means comprising a signal receiver, power actuated mechanism for continuously varying the tuning of said receiver over a predetermined range of frequencies, said mechanism acting to effect relative displacement of said elements synchronously with the variation of tuning of said receiver, and means responsive to the output of the receiver for terminating operation of said mechanism when said receiver is tuned to said signal.

8. In apparatus for correcting the zero reading of an altimeter, the combination with cooperating elements affording a visual indication, said elements being relatively movable in response to variation in barometric pressure, of means for automatically effecting an auxiliary relative movement of said elements to a position determined by the frequency of a transmitted signal, said means comprising a signal receiver including a highly selective resonant device, power actuated mechanism for continuously varying the tuning of said receiver over a predetermined range of frequencies, said mechanism acting to effect relative displacement of said elements synchronously with the variation of tuning of said receiver, and means responsive to the output of said highly selective resonant device for terminating operation of said mechanism when said receiver is tuned to said signal.

9. In apparatus for correcting the zero reading of an altimeter having an adjustably movable element and an element movable with respect to said adjustably movable element in response to variation in barometric pressure, the combination with a receiver for signals transmitted at a frequency proportioned to the barometric pressure at a reference point, said receiver including a highly selective resonant device, of a motor for continuously varying the tuning of said receiver over the range of transmitted frequencies, a connection between said motor and the adjustably movable element of said altimeter, and means responsive to the output of said device for terminating operation of the motor.

JAMES ROBINSON.